US012771940B2

(12) United States Patent
Ren et al.

(10) Patent No.: US 12,771,940 B2
(45) Date of Patent: Oct. 20, 2026

(54) SENSOR DRIVE MECHANISM

(71) Applicant: AAC Microtech (Changzhou) Co., Ltd., Changzhou City (CN)

(72) Inventors: Zhang Ren, Changzhou (CN); Yun Tang, Changzhou (CN); Wei Song, Changzhou (CN)

(73) Assignee: AAG Microtech (Changzhou) Co., Ld., Changzhou City (CN)

( * ) Notice: Subject to any disclaimer, the term of this patent is extended or adjusted under 35 U.S.C. 154(b) by 38 days.

(21) Appl. No.: 18/967,514

(22) Filed: Dec. 3, 2024

(65) Prior Publication Data

US 2025/0373947 A1 Dec. 4, 2025

Related U.S. Application Data

(63) Continuation of application No. PCT/CN2024/096733, filed on May 31, 2024.

(51) Int. Cl.

| | |
|---|---|
| ***H04N 23/68*** | (2023.01) |
| ***H04N 23/51*** | (2023.01) |
| ***H04N 23/52*** | (2023.01) |
| ***H04N 23/54*** | (2023.01) |

(52) U.S. Cl.

CPC ........... *H04N 23/687* (2023.01); *H04N 23/51* (2023.01); *H04N 23/52* (2023.01); *H04N 23/54* (2023.01)

(58) Field of Classification Search

CPC ...... H04N 23/687; H04N 23/51; H04N 23/52; H04N 23/54; H04N 23/55; H04N 23/57

See application file for complete search history.

(56) References Cited

U.S. PATENT DOCUMENTS

| | | | | |
|---|---|---|---|---|
| 2014/0355118 | A1* | 12/2014 | Park | H04N 23/687 359/557 |
| 2021/0105388 | A1* | 4/2021 | Lin | H02K 41/0356 |
| 2022/0345629 | A1* | 10/2022 | Park | H04N 23/57 |
| 2024/0061317 | A1* | 2/2024 | You | G03B 3/10 |
| 2024/0292076 | A1* | 8/2024 | Park | H04N 23/57 |

* cited by examiner

*Primary Examiner* — Christopher K Peterson

(74) *Attorney, Agent, or Firm* — Wiersch Law Group

(57) ABSTRACT

The present disclosure discloses a sensor drive mechanism including a housing, an image sensor module with an optical axis, an elastic support member, a driving coil fixed on the image sensor module, and at least one magnet system fixed on the housing. Each of the at least one magnet system includes a plurality of magnet units arranged at intervals. Each of the plurality of magnet units includes a first magnet, a second magnet, and a third magnet successively arranged. A magnetization direction the first magnet and a magnetization direction the third magnet are opposite and both parallel to the optical axis direction. A magnetization direction of the second magnet is perpendicular with the optical axis direction.

5 Claims, 5 Drawing Sheets

A-A

B-B

SENSOR DRIVE MECHANISM

FIELD OF THE PRESENT DISCLOSURE

The present disclosure relates to drive mechanism technologies, especially relates to a sensor drive mechanism.

DESCRIPTION OF RELATED ART

Sensor drive mechanism is widely used in various imaging devices to improve imaging quality by providing OIS (optical image stabilizer) function.

In related art, the sensor drive mechanism generally includes a stator and a movable member including an image sensor moving relative to the stator. A coil and a magnet unit are separately mounted on the stator and the movable member for generating driving force so that the image sensor is driven to move in a direction perpendicular with its optical axis to achieve OIS function. However, the sensor drive mechanism usually includes only one magnet unit surrounding the image sensor. Accordingly, the BL value of the magnet unit is not high enough thus limiting the OIS performance of the imager sensor drive mechanism. Increasing the magnetization of the magnet unit may make against the imaging quality of the image sensor due to magnetic flux leakage.

Therefore, it is necessary to provide an improved sensor drive mechanism to overcome the problems mentioned above.

SUMMARY OF THE INVENTION

One object of the present disclosure is to provide a sensor drive mechanism with higher BL value.

The sensor drive mechanism includes a housing with a receiving space, including: a top cover, including a first hole penetrating thereon; and a bottom cover enclosed the receiving space with the top cover; an image sensor module, located opposite to the first hole and received in the receiving space; an elastic support member, fixed on an inner surface of the housing and configured to suspend the image sensor module in the receiving space; a driving coil, fixed on the image sensor module; and at least one magnet system fixed on the housing, configured to interact with the driving coil to drive the image sensor module to move in a plane perpendicular with an optical axis direction; wherein each of the at least one magnet system includes a plurality of magnet units arranged at intervals; each of the plurality of magnet units includes a first magnet, a second magnet, and a third magnet successively arranged along a direction perpendicular with the optical axis direction; a magnetization direction the first magnet and a magnetization direction the third magnet are opposite and both parallel to the optical axis direction; a magnetization direction of the second magnet is perpendicular with the optical axis direction.

As an improvement, the image sensor module is configured to move along a first direction and a second direction perpendicular with each other; the first direction and the second direction are both perpendicular with the optical axis direction; each of the plurality of magnet units is L-shaped; each of the plurality of magnet units includes a first magnet segment extended along the first direction, and a second magnet segment extended along the second direction.

As an improvement, the housing is rectangular; a total number of the plurality of magnet units is four; each of the four magnet units further includes a corner magnet segment connected with the first magnet segment and the second magnet segment; the corner magnet segment is arranged corresponding to a corner of the housing.

As an improvement, a total number of the at least one magnet system is two; the two magnet systems are separately mounted on the top cover and the bottom cover; the driving coil is located between the two magnet systems.

As an improvement, each of the at least one magnet system further includes a magnetic plate sandwiched between the magnet unit and housing.

As an improvement, the first magnet, the second magnet, and the third magnet are integrated molded or glued to each other.

As an improvement, along the optical axis direction, a height of the first magnet is equal to a height of the third magnet, and larger than a height of the second magnet.

As an improvement, including a conductive member including one end electrically connected with the image sensor module and the other end connected with external device.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
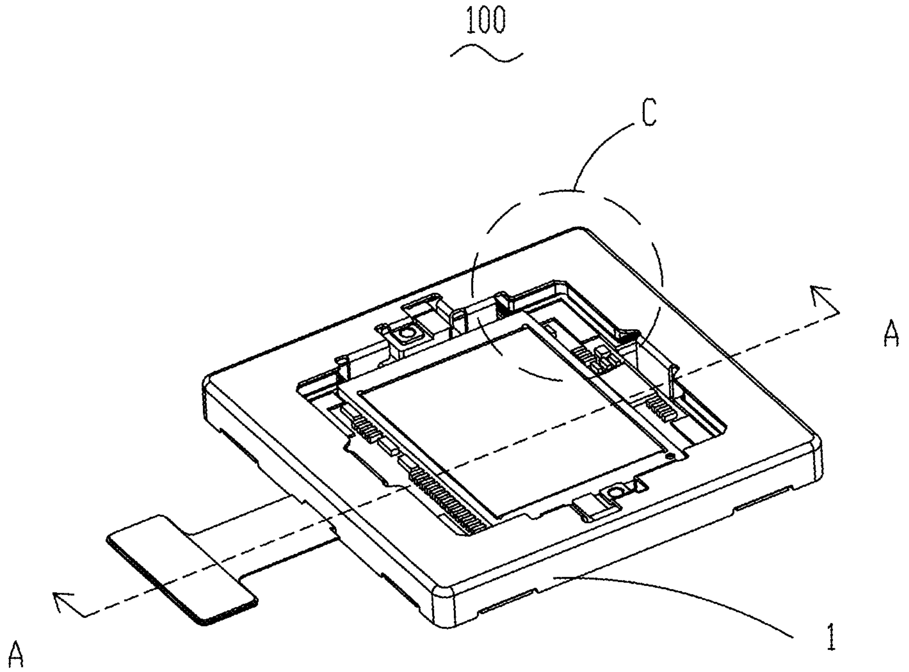
FIG. 1 is an isometric view of a sensor drive mechanism in accordance with an exemplary embodiment of the present disclosure.
Figure 2:
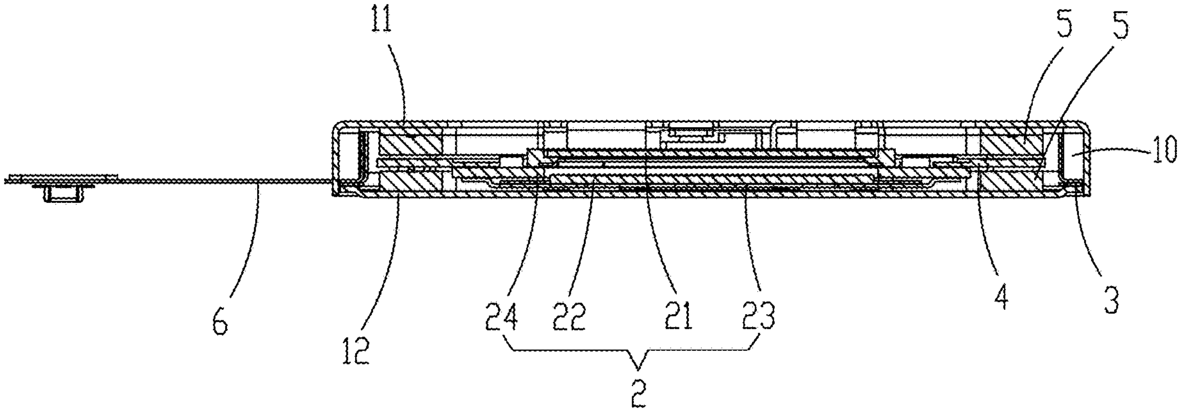
FIG. 2 is a cross-sectional view of the sensor drive mechanism taken along line A-A in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-6 together, a sensor drive mechanism 100 provided by an exemplary embodiment of the present disclosure includes a housing 1 with a receiving space 10, an image sensor module 2 with an optical axis received in the receiving space 10, an elastic support member 3 fixed on an inner surface of the housing 1 and configured to suspend the image sensor module 2 in the receiving space 10, a driving coil 4 fixed on the image sensor module 2, at least one magnet system 5 fixed on the housing 1, and a conductive member 6 including one end electrically connected with the image sensor module 2 and the other end connected with external device.

Specifically, the housing 1 includes a top cover 11 including a first hole 111 penetrating thereon, and a bottom cover 12 enclosed the receiving space 10 with the top cover 11. The first hole 111 connects the receiving space 11 with outside. The image sensor module 2 is located opposite to the first hole 111. The elastic support member 3 is configured to suspend the image sensor module 2 in the receiving space 10. In one embodiment, the elastic support member 3 is a flexible circuit board.

The magnet system 5 is arranged opposite to the driving coil 4 and interacts with the driving coil 4, thus driving the image sensor module 2 to move in a plane perpendicular with an optical axis direction for achieving OIS function. It should be understood that the optical axis direction Z is a direction parallel to an optical axis of the imager sensor module 2. The driving coil 4 and the magnet system 5 is opposite to each other along the optical axis direction. In particular, the image sensor module 2 is driven to move along a first direction X and a second direction Y perpendicular with each other. The first direction X and the second direction Y are both perpendicular with the optical axis direction Z. It should be understood that a lens module is generally located above the sensor drive mechanism 100 along the optical axis direction Z.

Figure 3:
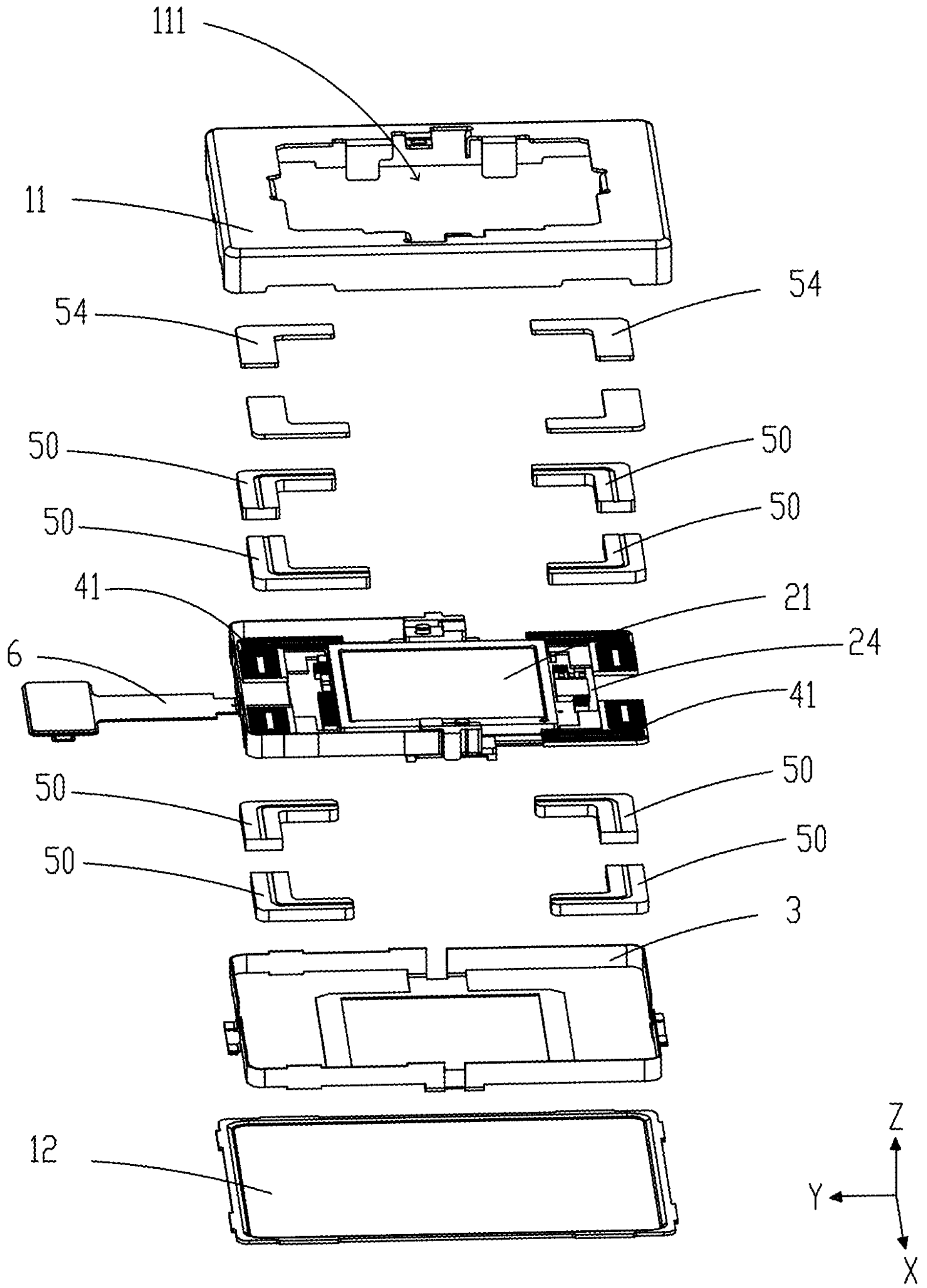
FIG. 3 is an exploded view of the sensor drive mechanism in FIG. 1.

In one embodiment, a total number of the at least one magnet system 5 is two. The two magnet systems 5 are separately mounted on the top cover 11 and the bottom cover 12. The driving coil 4 is located between the two magnet systems 5. Each of the two magnet systems 5 includes a plurality of magnet units 50 arranged at intervals. In one embodiment, a total number of the plurality of magnet units 50 is four. As shown in FIG. 3, it should be understood that the driving coil 4 also includes four coils 41 which is one-to-one correspondence to the four magnet units 50.

As shown in FIGS. 2-6, each of the four magnet units 50 is L-shaped, including a first magnet segment 501 extended along the first direction X, and a second magnet segment 502 extended along the second direction Y, and a corner magnet segment 503 connected with the first magnet segment 501 and the second magnet segment 502. The housing 1 is rectangular. The corner magnet segment 503 is arranged corresponding to a corner of the housing 1. Correspondingly, the driving coil 4 is also L-shaped. To be specific, the first magnet 51, the second magnet 52, and the third magnet 53 are all L-shaped. The first magnet segment 501 includes a portion of the first magnet 51, the second magnet 52, and the third magnet 53 extended along the first direction X. The second magnet segment 502 includes a portion of the first magnet 51, the second magnet 52, and the third magnet 53 extended along the second direction Y.

Figure 4:
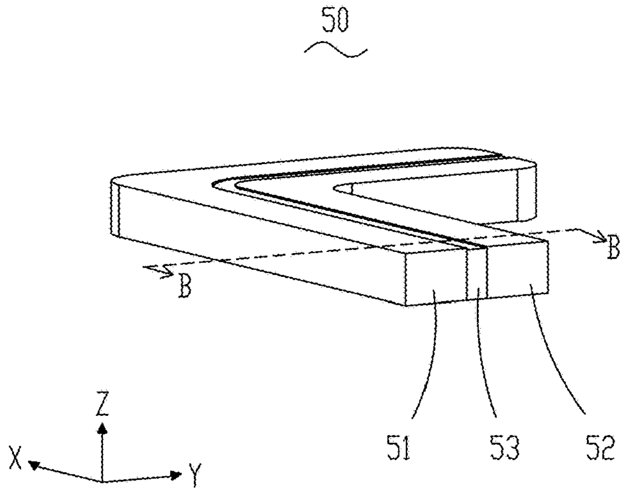
FIG. 4 is an isometric view of a magnet unit of sensor drive mechanism in FIG. 1.
Figure 5:
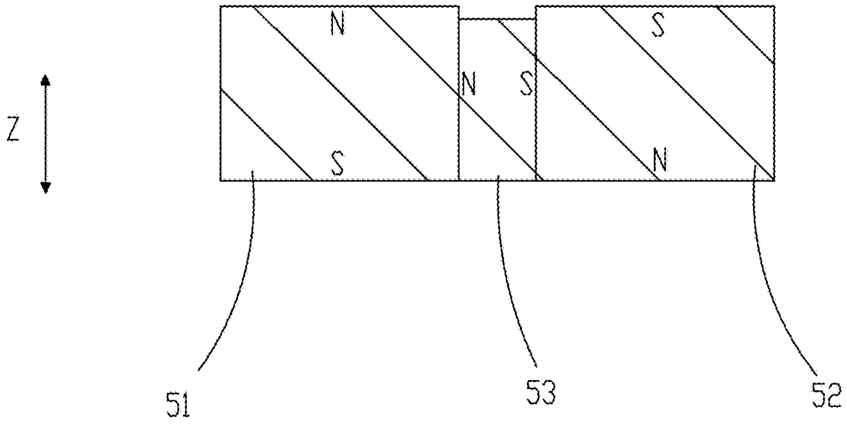
FIG. 5 is a cross-sectional view of the magnet unit taken along line B-B in FIG. 4.
Figure 6:
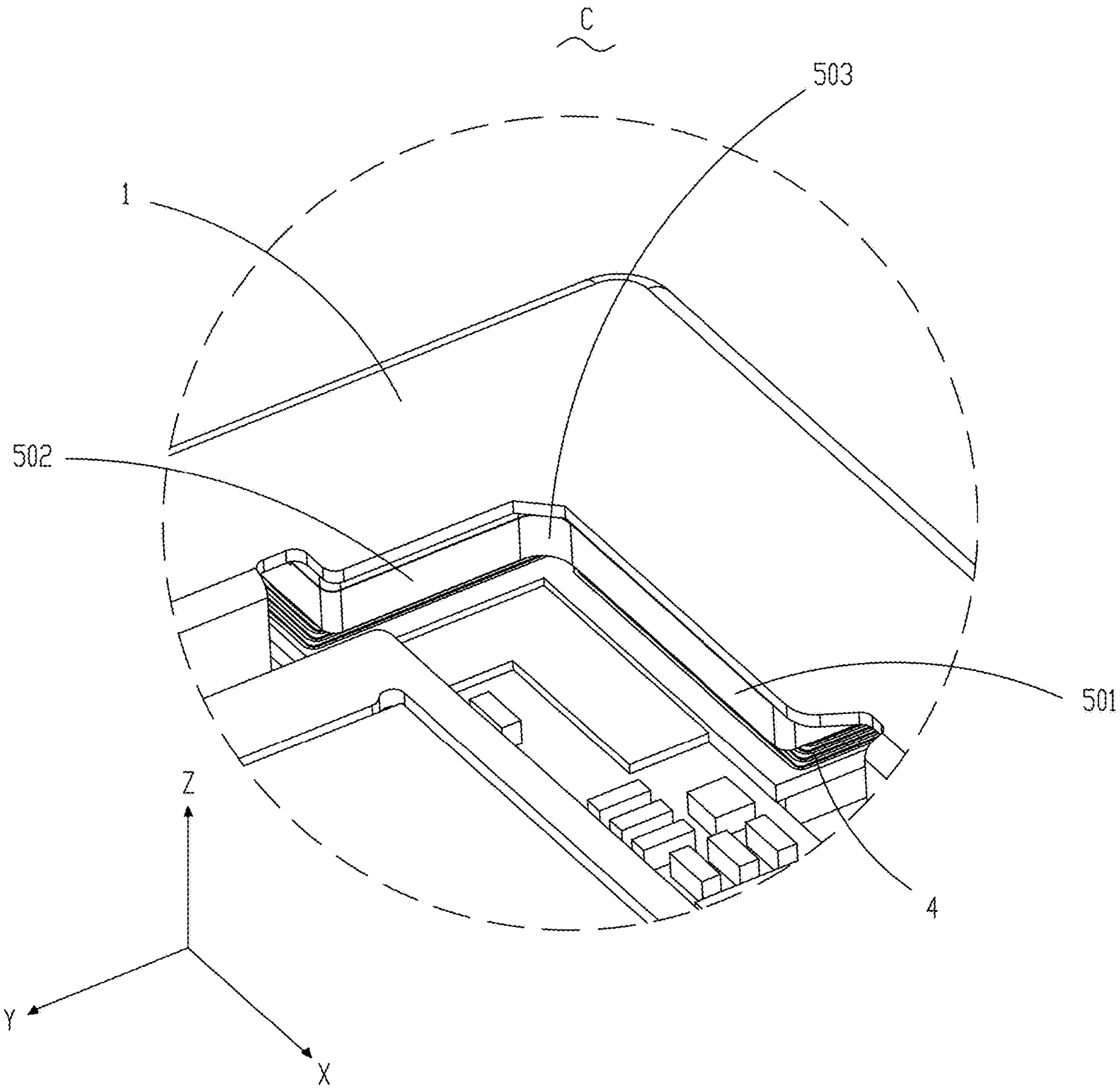
FIG. 6 is an enlarged view of part C in FIG. 1.

Specifically, as shown in FIGS. 3-4, each of the four magnet units 50 includes a first magnet 51, a second magnet 52, and a third magnet 53 successively arranged along a direction perpendicular with the optical axis direction Z. The first magnet 51, the second magnet 52, and the third magnet 53 are integrated molded or glued to each other. A magnetization direction the first magnet 51 and a magnetization direction the third magnet 53 are opposite and both parallel to the optical axis direction Z. A magnetization direction of the second magnet 52 is perpendicular with the optical axis direction Z. Particularly, a pole of the first magnet 51 facing the top cover 11 is N pole. A pole of the second magnet 52 facing the top cover 11 is S pole. The magnet system 5 further includes four magnetic plates 54 sandwiched between each magnet unit 50 and housing 1, respectively. The magnetic plate 54 is configured to reduce the effect of the magnetic flux leakage of the magnet on the image sensor module 2.

Furthermore, along the optical axis direction Z, a height of the first magnet 51 is equal to a height of the third magnet 53, and larger than a height of the second magnet 52.

Compared with the related art, the sensor drive mechanism includes a driving coil and two magnet systems located on two sides of the driving coil along the optical axis direction. Each of the two magnet systems includes four magnet units arranged at intervals. Each of the magnet units includes a first magnet, a second magnet, and a third magnet successively arranged. A magnetization direction the first magnet and a magnetization direction the third magnet are opposite and both parallel to the optical axis direction; a magnetization direction of the second magnet is perpendicular with the optical axis direction. By providing a magnet unit having three attached magnets, the BL value of the sensor drive mechanism is effectively increased, thus improving the OIS performance of the image sensor module.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sensor drive mechanism comprising:

a housing with a receiving space, including:

a top cover, including a first hole penetrating thereon; and a bottom cover enclosed the receiving space with the top cover;

an image sensor module, located opposite to the first hole and received in the receiving space;

an elastic support member, fixed on an inner surface of the housing and configured to suspend the image sensor module in the receiving space;

a driving coil, fixed on the image sensor module; and at least one magnet system fixed on the housing, configured to interact with the driving coil to drive the image sensor module to move in a plane perpendicular with an optical axis direction; wherein each of the at least one magnet system includes a plurality of magnet units arranged at intervals; each of the plurality of magnet units includes a first magnet, a second magnet, and a third magnet successively arranged along a direction perpendicular with the optical axis direction; a magnetization direction the first magnet and a magnetization direction the third magnet are opposite and both parallel to the optical axis direction; a magnetization direction of the second magnet is perpendicular with the optical axis direction;

wherein the image sensor module is configured to move along a first direction and a second direction perpendicular with each other; the first direction and the second direction are both perpendicular with the optical axis direction; each of the plurality of magnet units is L-shaped; each of the plurality of magnet units includes a first magnet segment extended along the first direction, and a second magnet segment extended along the second direction;

the housing is rectangular: a total number of the plurality of magnet units is four; each of the four magnet units further includes a corner magnet segment connected with the first magnet segment and the second magnet segment; the corner magnet segment is arranged corresponding to a corner of the housing; and each of the at least one magnet system further comprises a magnetic plate sandwiched between the magnet unit and housing to reduce effect of magnetic flux leakage of the magnet system on the image sensor module.

2. The sensor drive mechanism as described in claim 1, wherein a total number of the at least one magnet system is two; the two magnet systems are separately mounted on the top cover and the bottom cover; the driving coil is located between the two magnet systems.

3. The sensor drive mechanism as described in claim 1, wherein the first magnet, the second magnet, and the third magnet are integrated molded or glued to each other.

4. The sensor drive mechanism as described in claim 1, wherein along the optical axis direction, a height of the first magnet is equal to a height of the third magnet, and larger than a height of the second magnet.

5. The sensor drive mechanism as described in claim 1, further comprising a conductive member including one end electrically connected with the image sensor module and the other end connected with external device.

* * * * *